United States Patent
Tanaka et al.

(10) Patent No.: US 6,493,379 B1
(45) Date of Patent: Dec. 10, 2002

(54) ARRIVAL DIRECTION ESTIMATION METHOD USING AN ARRAY ANTENNA AND DS-CDMA RECEIVER UNIT USING THE METHOD

(75) Inventors: Yoshinori Tanaka, Kawasaki (JP); Shuji Kobayakawa, Kawasaki (JP); Masafumi Tsutsui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/258,441

(22) Filed: Feb. 26, 1999

(30) Foreign Application Priority Data

Mar. 5, 1998 (JP) ............................................. 10-053255

(51) Int. Cl.⁷ ............................. H04B 1/707; H04L 1/02
(52) U.S. Cl. ........................ 375/150; 375/148; 375/347; 370/342; 342/378
(58) Field of Search .............................. 375/142, 147, 375/148, 149, 150, 346, 347, 140; 370/320, 335, 342, 441; 342/417, 378, 445, 450, 453; 455/272

(56) References Cited

FOREIGN PATENT DOCUMENTS

WO WO96/37975 11/1996

*Primary Examiner*—Betsy L. Deppe
(74) *Attorney, Agent, or Firm*—Katten, Muchin, Zavis Rosenman

(57) ABSTRACT

The present invention relates to an arrival direction estimation method using an array antenna and a DS-CDMA receiver unit using this method. The method produces an accurate estimate of the arrival direction of a desired signal regardless of reception level and high interference. In a DS-CDMA communication system for performing a transmission by a spreading process using a code having a period longer than a symbol length, received signals from an array antenna are subjected to a despreading process by despreading units. A cross-correlation function with time lags of the recieved signals is obtained by inverse-modulating despread output signals by a known symbol in an inverse modulator. An arrival direction of a received signal is estimated by an arrival direction estimation unit based on the cross-correlation function. A beam former combines the despread output signals depending on the arrival direction and outputs an output signal to a channel receiver.

20 Claims, 9 Drawing Sheets

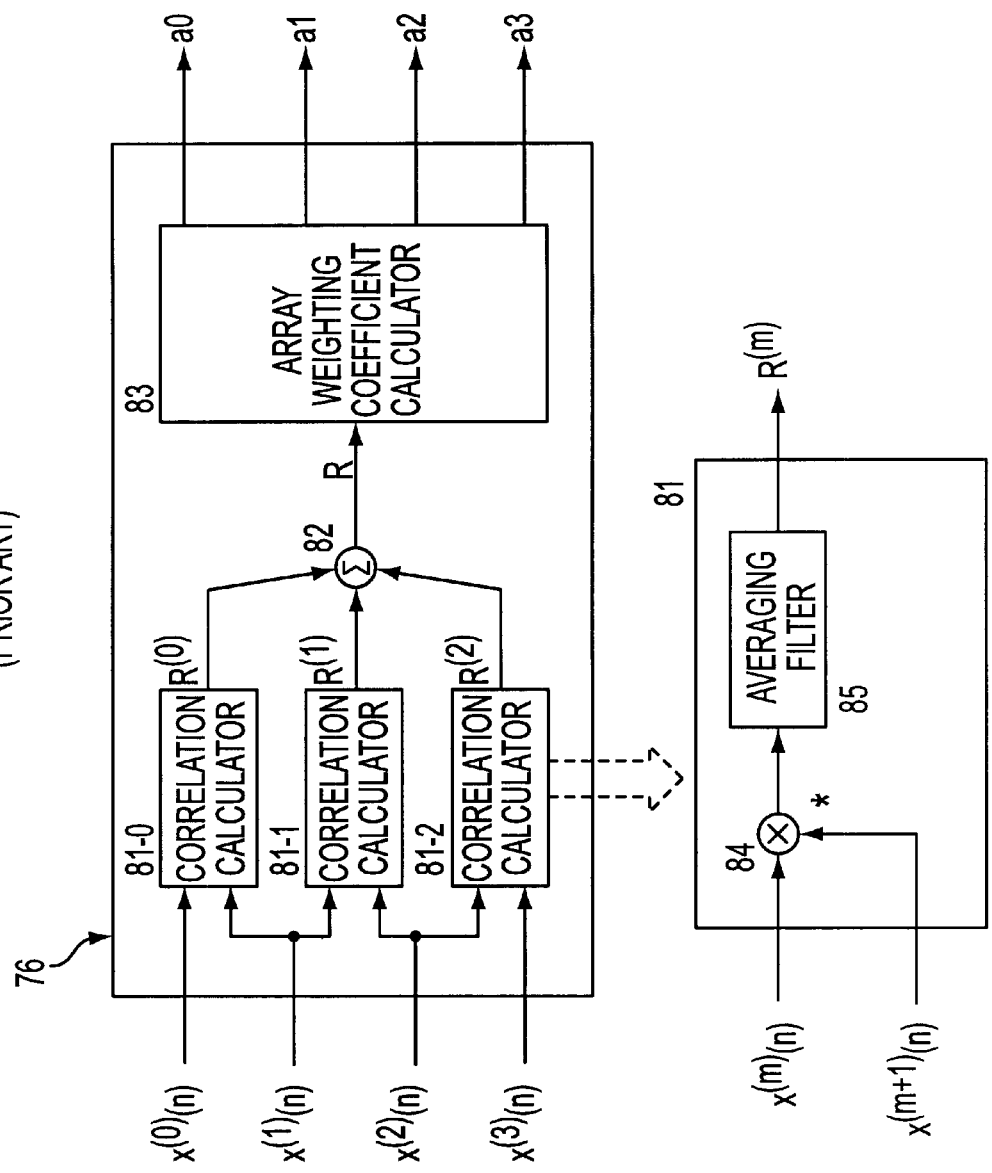

US 6,493,379 B1

ARRIVAL DIRECTION ESTIMATION METHOD USING AN ARRAY ANTENNA AND DS-CDMA RECEIVER UNIT USING THE METHOD

BACKGROUND OF THE INVENTION

The present invention relates to an arrival direction estimation method using an array antenna for estimating an arrival direction of a desired signal. The present invention further relates to a DS-CDMA receiver unit in a Direct Sequence Code Division Multiple Access (DS-CDMA) system.

In a base station of a DS-CDMA communication system, signal reception is performed by utilizing an array antenna. Further, an arrival direction of a desired signal is estimated from signals received from the array antenna. By transmitting and receiving in a beam directed in the estimated arrival direction, it is possible to reduce both interference and required transmission power due to an increase in antenna gain. Therefore, it is desirable that the arrival direction of the desired signal is estimated accurately.

FIG. 7 is a diagram showing a receiver unit of a base station using an array antenna. In particular, FIG. 7 shows array antenna elements 71-0 through 71-(M−1) forming a receiving antenna, reception processors 72-0 to 72-(K−1), despreading units 73-0 to 73-(M−1), beam forming unit 74, a channel receiver 75, an arrival direction estimation unit 76 and a beam former 77.

Received signals $r^{(0)}$ to $r^{(M-1)}$ from the array antenna elements 71-0 to 71-(M−1) are input to the reception processors 72-0 through 72-(K−1) corresponding to the different channels. In addition, the reception processor 72-0 carries out a despreading process with respect to the received signals by the despreading units 73-0 to 73-(M−1), which are input with a spreading code $C_0$. The despreading units 73-0 to 73-(M−1) provide despread output signals $x^{(0)}$ to $x^{(M-1)}$ to the arrival direction estimation unit 76 and the beam former 77 of the beam forming unit 74. The arrival direction estimation unit 76 estimates an arrival direction of a desired signal based on a cross-correlation function among the received signals received by adjacent antenna elements.

The beam former 77 multiplies a weighting coefficient obtained by estimating the arrival direction by the arrival direction estimation unit 76 to the despreading output signals $x^{(0)}$ through $x^{(M-1)}$. Further, the beam former 77 then combines the products to provide an output signal to the channel receiver 75. Therefore, received data of the kth channel is re-generated by the reception processors 72-0 to 72-(K−1) corresponding to channels 0 through K−1.

FIG. 8 is a diagram showing a conventional beam forming unit 74 including the arrival direction estimation unit 76. In particular, FIG. 8 shows the beam forming unit 74 including an arrival direction estimation unit 76 and a beam former 77 having multipliers 78-0 to 78-3 and an adder 79.

Received signals $x^{(0)}(n)$ to $x^{(3)}(n)$ from the antenna elements 71-0 to 71-3 (refer to FIG. 7) are input to the arrival direction estimation unit 76 and the beam former 77. The arrival direction estimation unit 76 outputs to the beam former 77 weighting coefficients a0 to a3 obtained by the estimation of the arrival direction of the desired signal. The weighting coefficients a0 to a3 are respectively input to the multipliers 78-0 to 78-3 of the beam former 77 to be multiplied with signals $x^{(0)}(n)$ to $x^{(3)}(n)$ and then coherently summed by the adder 79. An output signal y(n) of the adder 79 is then input to the channel receiver 75 (refer to FIG. 7).

FIG. 9 is a diagram showing a conventional arrival direction estimation unit. In particular, FIG. 9 shows an arrival direction estimation unit 76 including correlation calculators 81-0 through 81-2, an adder 82, and an array weighting coefficient calculator 83. A correlation calculator 81 is shown in the lower part of FIG. 9, wherein each of the correlation calculators 81-0 to 81-2 include a multiplier 84 and an averaging filter 85. Further, received signals $x^{(m)}(n)$ and $x^{(m+1)}(n)$ from mth and (m+1)th adjacent antenna elements are input to the multiplier 84. In this case, one of the received signals is a complex conjugate (indicated by *), and a complex conjugate product between the received signals from the adjacent antenna elements (cross-correlation function of the zero lag) is obtained. A temporal average is also performed by the averaging filter 85 so that a cross-correlation function $R^{(m)}$ is output.

A received signal $r^{(m)}(t)$ from a mth antenna element at a time t satisfying $(n-1)T \leq t < nT$ is described by the following formula (1), where $\phi_i^{(m)}$ for I=0 to N−1 in formula (1) is described by formula (2), N denotes a number of users, $A_i$ denotes a received amplitude of an ith user signal, $c_i(t)$ denotes a spreading code of the ith user, $\tau_i$ denotes a relative delay of the ith user, $b_i$ denotes an ith user transmission symbol, d denotes a distance between the antenna elements, $\theta_i$ denotes an arrival angle of the ith user signal, $N^{(m)}(t)$ denotes a noise signal, T denotes a symbol length, and a multipath is not taken into consideration for the sake of convenience.

$$r^{(m)}(t) = \sum_{i=0}^{N-1} A_i c_i(t - \tau_i) b(t - \tau_i) \exp(-j\phi_i^{(m)}) + N^{(m)}(t) \quad (1)$$

$$\phi_i^{(m)} = 2\pi m d \sin\theta_i \quad (2)$$

A despreading output signal $x_{(k)}^{(m)}(n)$ which is obtained by subjecting the received signal $r^{(m)}(t)$ from the mth antenna element to a despreading process by the spreading code $c_{(k)}(t)$ of the kth user is described by the following formula (3), where $w_{ij}(n)$ in the formula (3) is described by the formula (4).

$$\begin{aligned}
x_k^{(m)}(n) &= \int_{(n-1)T}^{nT} r^{(m)}(t) c_k * (t - \tau_k) dt \quad (3) \\
&= A_k b_k(n) \exp(-j\phi^{(m)}) + \\
&\quad \int_{(n-1)T}^{nT} \left[ \sum_{\substack{i=0 \\ i \neq k}}^{N-1} A_i c_i(t - \tau_i) c_k * (t - \tau_k) b_i(t - \tau_i) \exp(-j\phi^{(m)}) \right] dt + \\
&\quad N^{(m)}(n) \\
&= A_k b_k(n) \exp(-j\phi^{(m)}) + \\
&\quad \sum_{\substack{i=0 \\ i \neq k}}^{N-1} \left[ \int_{(n-1)T}^{nT} c_i(t - \tau_i) c_k * (t - \tau_k) b_i(t - \tau_i) dt \right] \exp(-j\phi^{(m)}) + \\
&\quad N^{(m)}(n) \\
&\cong A_k b_k(n) \exp(-j\phi^{(m)}) + \sum_{\substack{i=0 \\ i \neq k}}^{N-1} [A_i w_{ij}(n) \exp(-j\phi_i^{(m)})] + N^{(m)}(n)
\end{aligned}$$

$$w_{ij}(n) \equiv \int_{(n-1)T}^{nT} c_i(t - \tau_i) c_k * (t - \tau_k) bi(t - \tau_i) dt \quad (4)$$

In addition, the correlation calculator 81 of FIG. 9 calculates a correlation $R_k^{(m)}$ between the received symbol $x^{(m)}(n)$ of the mth antenna element and the received symbol $x^{(m+1)}(n)$ of the (m+1)th antenna element based on the following formula (5), where brackets "< >" indicate averaging and the terms inside the brackets "< >" are shown in the formula (6).

$$R_k^{(m)} = <x_k^{(m)}(n)x_k^{(m+1)*}(n)> \tag{5}$$

$$x_k^{(m)}(n)x_k^{(m+1)*}(n) = |A_k|^2|b|^2\exp[j(\phi_k^{(m)} - \phi_k^{(m+1)})] + \tag{6}$$
$$\sum_{\substack{i=0 \\ i \neq k}}^{N-1} |A_i|^2|W_{ik}(n)|^2\exp[j(\phi_k^{(m)} - \phi_k^{(m+1)})] + N^{(m)*}(n)N^{(m)}*n$$

The correlation $R_k^{(m)}$ is then averaged for each of the antenna elements and a cross-correlation function $R_k$ among the adjacent antenna elements is obtained based on the following formula (7), where M denotes the number of antenna elements.

$$R_k = [1/(M-1)]\sum_{m=0}^{M-2} R_k^{(m)} \tag{7}$$

FIG. 9 shows a structure for adding the correlations $R^{(0)}$ to $R^{(2)}$ from the correlation calculators 81-0 to 81-2 by the adder 82. However, no calculation function related to the term [1/(M−1)] in the formula (7) is shown. Since (M−1) is a fixed value, it is clear that an averaging process can be carried out based on the addition.

In formula (6) as described above, the second term on the right hand side of the equal sign is an uncorrelated signal and the term $|W_{ik}(n)|$ is a small value. Hence, if there is no significant difference among the received signal amplitudes $A_i$ of each of the users, it is possible to extract by averaging a phase error of a desired signal (kth user) of the first term on the right hand side of the equal sign of the formula (6). Accordingly, based on a ratio of an imaginary part $Im(R_k)$ and a real part $Re(R_k)$ using the cross-correlation function $R_k$ of the formula (7), it is possible to estimate, from the following formula (8), an arrival angle $\theta_k$ of the kth user signal.

$$\theta_k = \sin^{-1}[(\frac{1}{2}\pi d)\tan^{-1}\{Im(R_k)/Re(R_k)\}] \tag{8}$$

According to the conventional arrival direction estimation method described above, the arrival direction is estimated from the strongest signal received after the despreading process, regardless of whether or not the desired signal exists. For this reason, it is difficult to estimate the correct arrival direction of the desired signal in cases where the reception amplitude of the desired signal is small and in cases where large interference signals exist.

For example, when a multi-rate transmission including a high-speed rate and a low-speed rate in the DS-CDMA communication system is made, the received signal of the high-speed rate user becomes an interference signal for the received signal of the low-speed rate user since the transmission power of the high-speed rate signal is large. Consequently, a problem exists in that it is difficult to estimate the arrival direction of the desired signal of the low-speed rate user.

SUMMARY OF THE INVENTION

Accordingly, it is an object of the present invention to enable estimation of the correct arrival direction of the desired signal in a DS-CDMA communication system using a code having a period longer than the symbol length of the spreading code, even when a interference signal exists.

These and other objects are met in accordance with an arrival direction estimation method of the present invention, using an array antenna in a DS-CDMA communication system for performing a transmission by performing a spreading process including a code having a period longer than a symbol length. The method also includes to subject received signals from the array antenna to a despreading process. A cross-correlation function of lags other than the zero lag for signals corresponding to adjacent antenna elements is obtained by inverse-modulating despead output signals by a known symbol. Further, an arrival direction of a desired signal based on the cross-correlation function is estimated.

It is also possible to use an average value of the cross-correlation function for a plurality of different lags as the cross-correlation function of the lags among the inverse modulated signals corresponding to the adjacent antenna elements, wherein the zero lag is excluded from this function. It is also possible to obtain the cross-correlation function using both positive and negative lags excluding the zero lag among the inverse modulated signals corresponding to the adjacent antenna elements. A pilot symbol may be used as the known symbol to inverse-modulate the received signals. It is also possible to provide a decision feedback symbol as the known symbol to inverse-modulate the received signals.

A DS-CDMA receiver unit according to the present invention is also provided for a DS-CDMA communication system, which carries out a transmission by performing a spreading process using a code having a period longer than a symbol length. The DS-CDMA includes despreading units for subjecting received signals from array antenna elements to a despreading process. Further included is a beam forming unit 4 for inputting despread output signals from the despreading units and a channel receiver for inputting output signals of the beam forming unit. The beam forming unit includes an inverse modulator for inverse-modulating the despread output signals by a known symbol, an arrival direction estimation unit for receiving signals from the inverse modulator and a beam former. The beam former provides an output by multiplying a weighting coefficient from the arrival direction estimation unit to the despread output signals and then adding such products.

The inverse modulator may be configured to use either a pilot symbol or a decision feedback signal, as the known symbol. The arrival direction estimation unit may include a correlation calculator for obtaining a cross-correlation among output signals of the inverse modulator corresponding to the adjacent antenna elements and an array weighting coefficient calculator for obtaining and averaging the cross-correlation functions with respect to a plurality of lags excluding a zero lag. The array weighting coefficient calculator then outputs a weighting coefficient obtained as a result of estimating the arrival direction based thereon. In this case, the cross-correlation function with respect to the plurality of lags may be calculated by providing first and second shift registers.

BRIEF DESCRIPTION OF THE DRAWINGS

FIG. 9 is a diagram showing the conventional arrival direction estimation unit.

DETAILED DESCRIPTION OF THE PREFERRED EMBODIMENT

Figure 1:
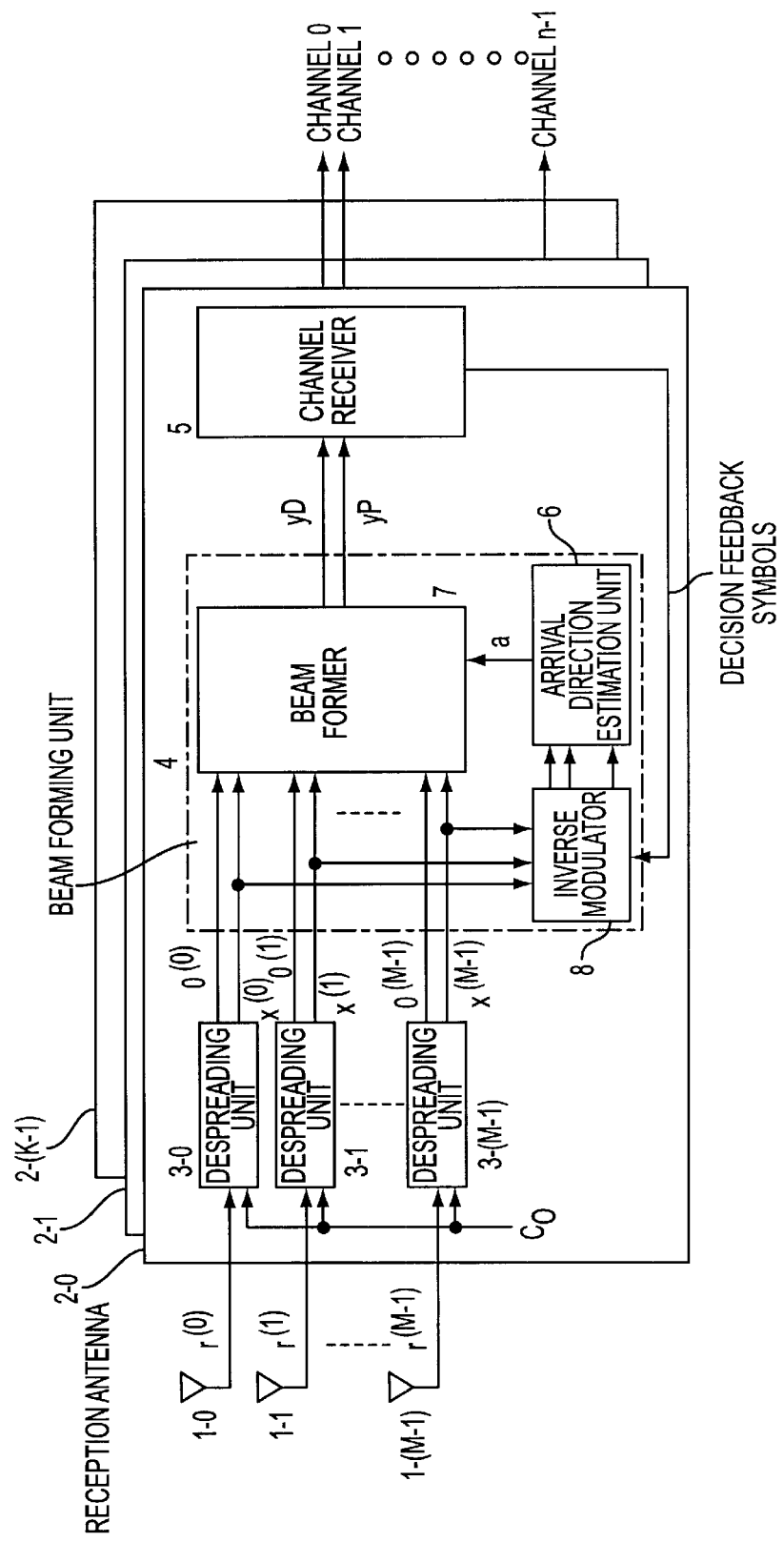
FIG. 1 is a diagram showing an embodiment of a DS-CDMA receiver unit according to the present invention.

FIG. 1 is a diagram showing an embodiment of a DS-CDMA receiver unit according to the present invention. As can be seen from FIG. 1, the receiver unit includes M array antenna elements 1-0 to 1-(M−1) forming a reception antenna, K reception processors 2-0 to 2-(K−1) provided in correspondence with K channels, M despreading units 3-0 to 3-(M−1), a beam forming unit 4 and a channel receiver 5. The beam forming unit 4 includes an arrival direction estimation unit 6, a beam former 7, and an inverse modulator 8. The reception processors 2-0 to 2-(K−1) each have the same structure and receive signals from the array antenna elements 1-0 to 1-(M−1).

FIG. 1 further shows the receiver unit of the DS-CDMA communication system using a code $C_0$ having a period longer than a symbol length. Received signals $r^{(0)}$ to $r^{(M-1)}$ from the M array antenna elements 1-0 to 1-(M−1) are respectively input to the despreading units 3-0 to 3(M−1) in the reception processor 2-0. For example, the despreading is carried out by the use of a spreading code $C_0$.

Figure 2:
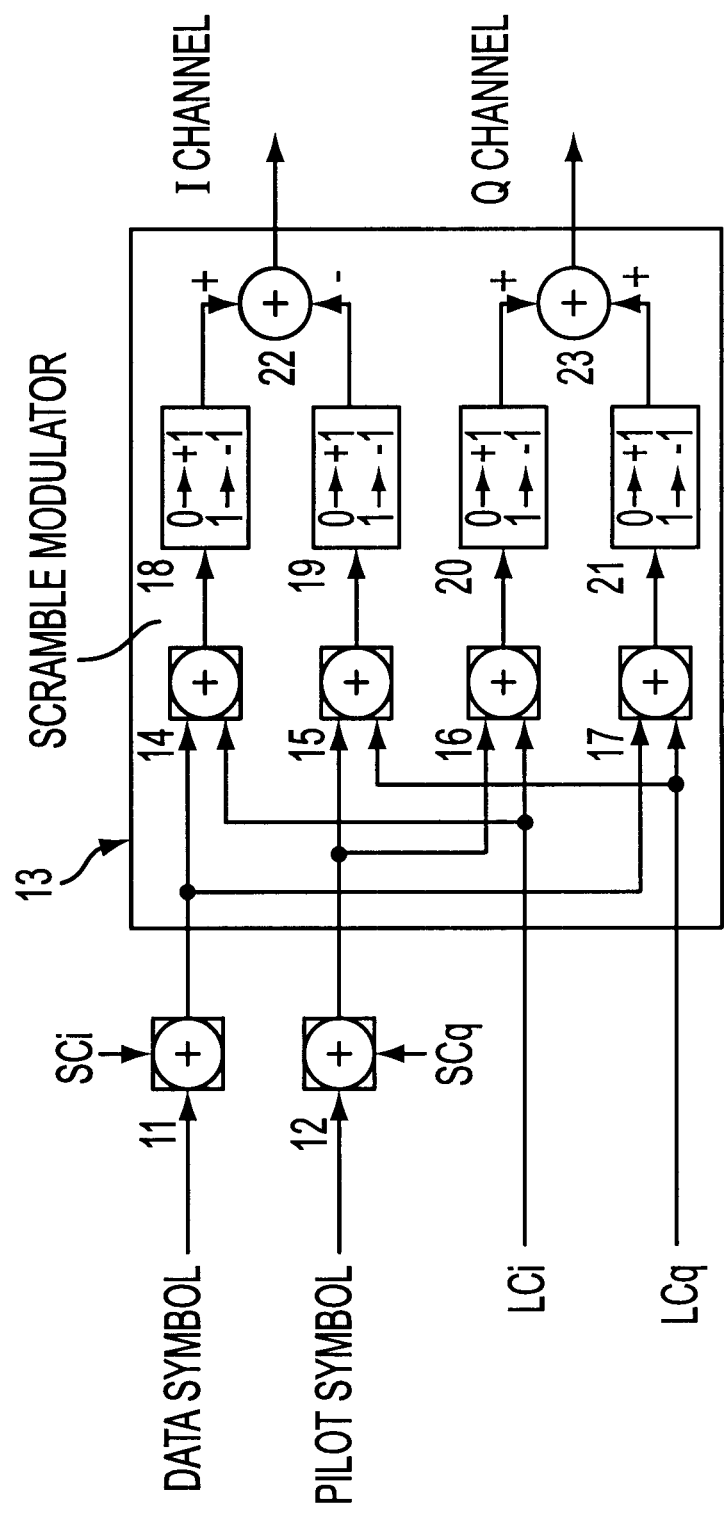
FIG. 2 is a diagram showing a spreading modulator of a transmission unit according to the present invention.

In this case, a transmission unit of a mobile station or the like would include a spreading modulator for the code. FIG. 2 shows an example of such a spreading modulator, which includes multipliers (exclusive-OR circuits) 11, 12 and 14 to 17, a scramble modulator 13, polarity converters 18 to 21, and adders 22 and 23.

With respect to a data symbol, a short code $SC_i$ of the quadrature code is multiplied by the multiplier 11 to provide code spreading. With respect to a pilot symbol, a short code $SC_q$ of the quadrature code is multiplied by the multiplier 12 to provide code spreading. As a result, a distribution is made to quadrature channels (I,Q).

In addition, codes $LC_i$ and $LC_q$ of the quadrature code which have a period longer than the symbol length are also distributed to the quadrature channels (I,Q) and input to the multipliers 14 through 17. For example with respect to the data symbol which is subjected to code spreading by the short code $SC_i$, the multiplier 14 multiplies the code $LC_i$ and the multiplier 17 multiples the long code $LC_q$ to carry out a scramble modulation. With respect to the pilot symbol which is subjected to code spreading by the short code $SC_q$, the multiplier 15 multiplies the code $LC_q$ and the multiplier 16 multiplies the long $LC_i$ to also carry out scramble modulation. In this case, the pilot symbol may be inserted and transmitted for every predetermined length of data symbols, as a known symbol having a number of symbols less than a predetermined length. Alternatively, it is possible to transmit the pilot symbol together with the data symbol having a phase that is orthogonal with respect to the data symbol.

Output signals of each of the multipliers 14 to 17 are converted in the polarity converters 18 to 21. For example, a logic "0" is converted into "+1" or a logic "1" is converted into "−1", which are then input to the adders 22 and 23. The adder 22 adds an output signal of the polarity converter 18 with a "+" polarity and adds an output signal of the polarity converter 19 with a "−" polarity. In other words, the adder 22 carries out a subtraction process. In addition, the adder 23 sums the output signals of the polarity converters 20 and 21. Accordingly, output signals of the adders 22 and 23 take a ternary value of +1, 0 or −1. The ternary value signals from the adders 22 and 23 are transmitted after carrying out a quadrature modulation or the like in a radio transmitter, which is not shown in FIG. 2. The radio transmitter transmits signals subjected to spreading modulation by the code.

Figure 3:
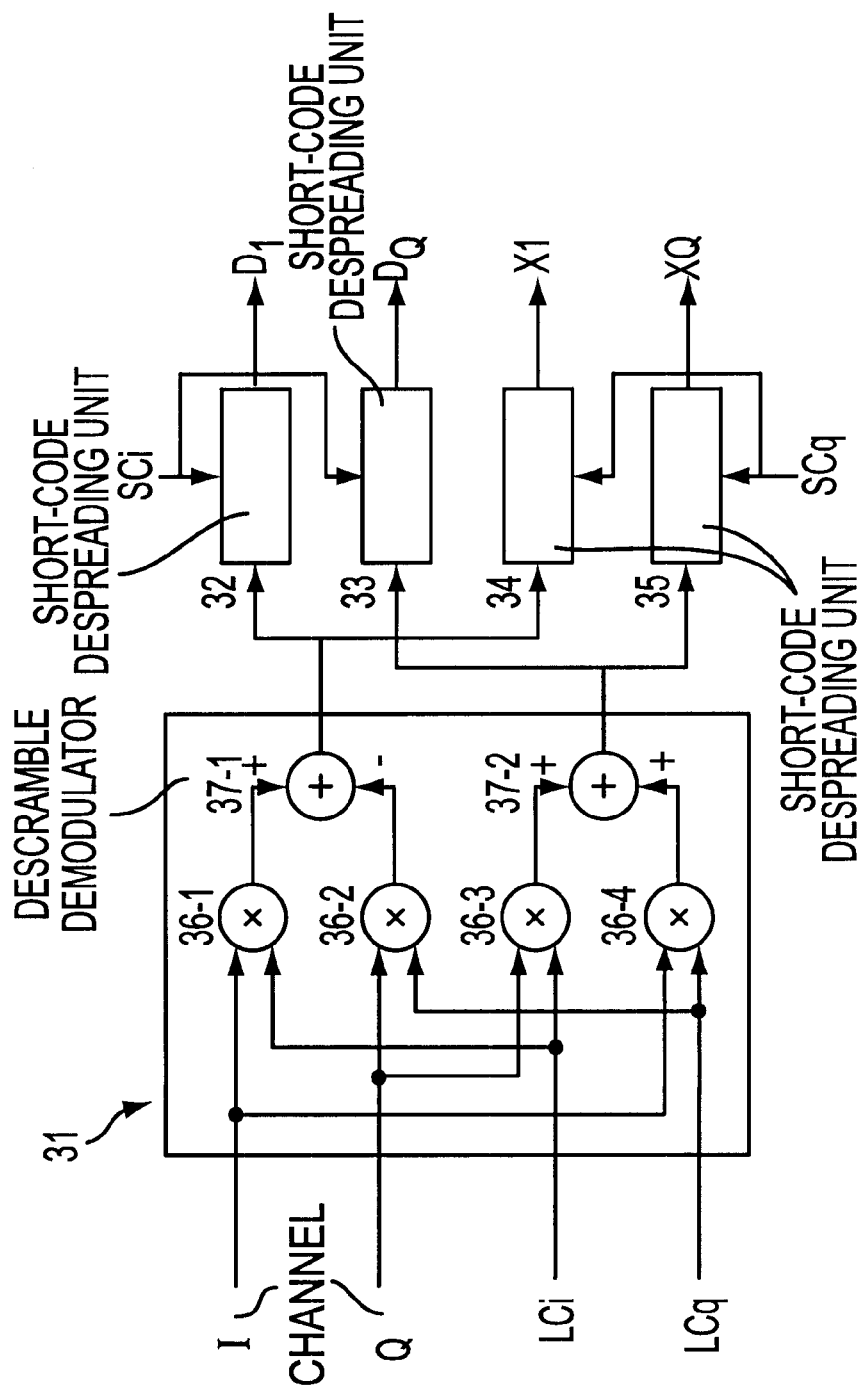
FIG. 3 is a diagram showing a despreading unit according to the present invention.

In the embodiment of the DS-CDMA receiver unit shown in FIG. 1, the despreading units 3-0 to 3(M−1) carry out processes complementary to the process of the spreading modulator shown in FIG. 2. As shown in FIG. 3, for example, each despreading unit includes a descrambler demodulator 31 and despreading units 32 to 35. The descramble demodulator 31 includes multipliers 36-1 to 36-4, adders 37-1 and 37-2.

As can be seen from FIG. 3, all of the inputs and outputs include I and Q channel signals. However, in FIG. 1, such detail was omitted. Instead, in FIG. 1, each of the I and Q channel signals are represented by a single signal. For example, receive signal r(0), code $C_0$, data signal D(0) and pilot signal x(0) of FIG. 1 correspond to I and Q channel signals, codes $LC_i$ and $LC_q$, data signals $D_I$ and $D_Q$, and pilot signals $x_I$ and $x_Q$, respectively in FIG. 3.

The received I and Q channel signals are first subjected to the quadrature modulation in the radio receiver, the illustration of which is omitted. The same I and Q channel signals are then input to the descramble demodulator 31 to be descrambled using the codes $Lc_i$ and $LC_q$. The descrambled signals are then input to the despreading units 32 to 35. Two of the descrambled signals are subjected to despreading using the short code $SC_i$ in the despreading units 32 and 33, which respectively output data symbols $D_I$ and $D_Q$ of the I and Q channels. While the other two descrambled signals are subjected to despreading using the short code $SC_q$ in the despreading units 34 and 35, which respectively output pilot symbols $x_I$ and $x_Q$ of the I and Q channels.

As described above, the despreading units 3-0 to 3-(M−1) of FIG. 1 are configured to output the data symbols and the pilot symbols by carrying out the despreading process. In the present invention, the cross-correlation function which is used to estimate the arrival direction is obtained using the known symbol. This known symbol may be the pilot symbol, as described above. Alternatively, it is also possible to feed back a data symbol to the inverse modulator 8 and to use this data symbol as the known symbol. In feeding back this data symbol, it would be judged by a judging unit included in the channel receiver. FIG. 1 shows the case where the pilot symbol is used as the known symbol.

When signal $x_k^{(m)}(n)$ subjected to the despreading is further subjected to inverse modulation using a known transmission symbol $b_k(n)$ of the kth user, a symbol is denoted by a $z_k^{(m)}(n)$, which is described by the following formula (9). The formula (9) is developed into the formulas (10) and (11), where $W_{ij}(n)$ in formula (11) is defined by the following formula (12).

$$Zk(m)(n) = x_k(m)(n)b_k(n) \quad 9$$

$$z_k^{(m)}(n) = x_k^{(m)}(n)bk*(n) \tag{9}$$

$$z_k^{(m)}(n) = A_k \exp(-j\phi^{(m)}) + \tag{10}$$

$$\int_{(n-1)T}^{nT} \left[ \sum_{\substack{i=0 \\ i \neq k}}^{N-1} A_i c_i(t-\tau_i) c_k*(t-\tau_k) \exp(-j\phi^{(m)}) \right] dt +$$

$$N^{(m)}(n) = A_k \exp(-j\phi^{(m)}) +$$

$$\sum_{\substack{i=0 \\ i \neq k}}^{N-1} A_i \left[ \int_{(n-1)T}^{nT} c_i(t-\tau_i) c_k*(t-\tau_k) dt \right] \exp(-j^{(m)}) + N^{(m)}(n)$$

$$z_k^{(m)}(n) \equiv A_k \exp(-j\phi^{(m)}) + \sum_{\substack{i=0 \\ i \neq k}}^{N-1} [A_i w_{ij}(n) \exp(-j\phi_i^{(m)}) + N^{(m)}(n) \tag{11}$$

$$w_{ij}(n) \equiv \int_{(n-1)T}^{nT} c_i(t-\tau_i) c_k*(t-\tau_k) dt \tag{12}$$

In formulas (9) through (12), $A_k$ denotes a reception amplitude of the $_k$th user, $C_k(t)$ denotes a spreading code of the $_i$th user, $\tau_k$ and $\tau_i$ respectively denote relative delays of the $_k$th and $_i$th users, $N^{(m)(n)}$ denotes a noise signal and T denotes a symbol length. Ci in formula 12 denotes initial spreading code.

As may be seen from the following formula (13), a correlation $R_k^{(m)}$ between a reception symbol $z^{(m)}(n)$ corresponding to the mth antenna element and L symbols before and after the reception symbol corresponding to the (m+1) th antenna element, is obtained by multiplying (½L) a summation of complex conjugate products amounting to 2L symbols in the positive and negative directions from −L to +L, excluding the zero lag, and averaging. The terms following the summation Σ are shown in formula (14).

$$R_k^{(m)} = \langle (1/2L) \sum_{\substack{l=-L \\ l \neq 0}}^{L} z^{(m)}(n) z^{(m+1)}*(n+1) \rangle \tag{13}$$

$$\sum_{\substack{l=-L \\ l \neq 0}}^{L} z^{(m)}(n) z^{(m+1)}*(n+1) =$$

$$|A_k|^2 \exp[j(\phi_k^{(m)} - \phi_k^{(m+1)})] + \sum_{\substack{l=-L \\ l \neq 0}}^{L} \sum_{\substack{i=0 \\ i \neq k}}^{N-1} |A_i|^2 W_{ik}(n)$$

$$W_{ik}*(n+1) \exp[j(\phi_i^{(m)} - \phi_i^{(m+1)})] + \sum_{\substack{l=-L \\ l \neq 0}}^{L} N^{(m)}(n) N^{(m)}*(n+1) \tag{14}$$

The formulas (13) and (14) show a case where both the positive and negative lags of the lags (time delays) other than the zero lag are used, where the correlation is obtained for the L symbols with respect to each of the positive and negative lags. When obtaining the cross-correlation for a plurality of different lags (time delays), it is possible to obtain the correlation for the L symbols of a plurality of lags in only the positive direction or negative direction. In addition, it is also possible to obtain the correlation for different numbers of symbols of different lags in the positive and negative directions.

As described above, the correlation is obtained for L symbols of the different lags in each of the positive and negative directions, excluding the zero lag (time delay), of the reception symbol $Z^{(m)}(n)$ corresponding to the mth antenna element and the reception symbol $z^{(m+1)}(n)$ corresponding to the (m+1) th antenna element. The arrival direction is estimated from this correlation. Hence, the arrival direction can be estimated by suppressing undesirable effects, even in cases where a phase deviation occurs due to fading.

By obtaining the average of $R^{(m)}$ by formula (13), a cross-correlation function $R_k$ among the adjacent antenna elements can be obtained from the following formula (15). In addition, an arrival angle $\theta_k$ of the kth user can be obtained from the following formula (16) which is similar to formula (8) as described above, using the cross-correlation function $R_k$.

$$R_k = \{1/(M-1)\} \sum_{m=0}^{M-2} R_k^{(m)} \tag{15}$$

Figure 4:
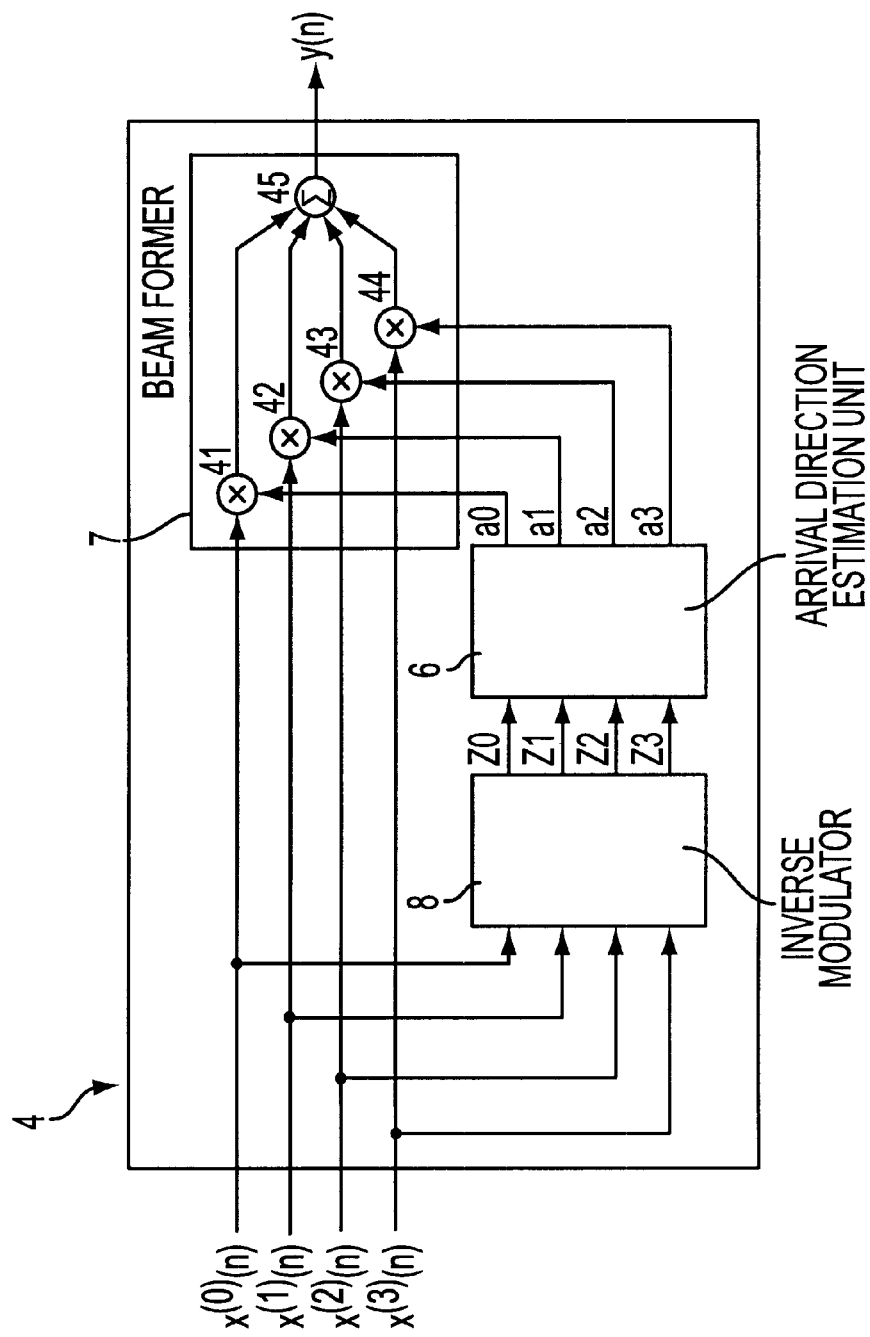
FIG. 4 is a diagram showing a beam forming unit according to the present invention.

FIG. 4 is a diagram showing the beam forming unit for this embodiment of the present invention. As can be seen from FIG. 4, the beam forming unit 4 includes an arrival direction estimation unit 6, an inverse modulator 8 and a beam former 7. The beam former 7 includes multipliers 41 to 44 and an adder 45.

The despread output signals $x^{(0)}(n)$ to $x^{(3)}(n)$ corresponding to the 4 antenna elements are input to the beam forming unit 4, which are inverse modulated by the inverse modulator 8 using the known transmission symbol such as the pilot symbol, as described above in conjunction with formula (10). As a result, inverse modulated signals z0 to z3 are output from the inverse modulator 8. For example, the signals z0 through z3 can be obtained by multiplying the pilot symbol by the despread output signals $x^{(0)}(n)$ to $x^{(3)}(n)$ upon reception of the pilot symbol, so as to obtain signals corresponding to the carriers of the desired signal excluding the pilot symbol component.

Figure 5:
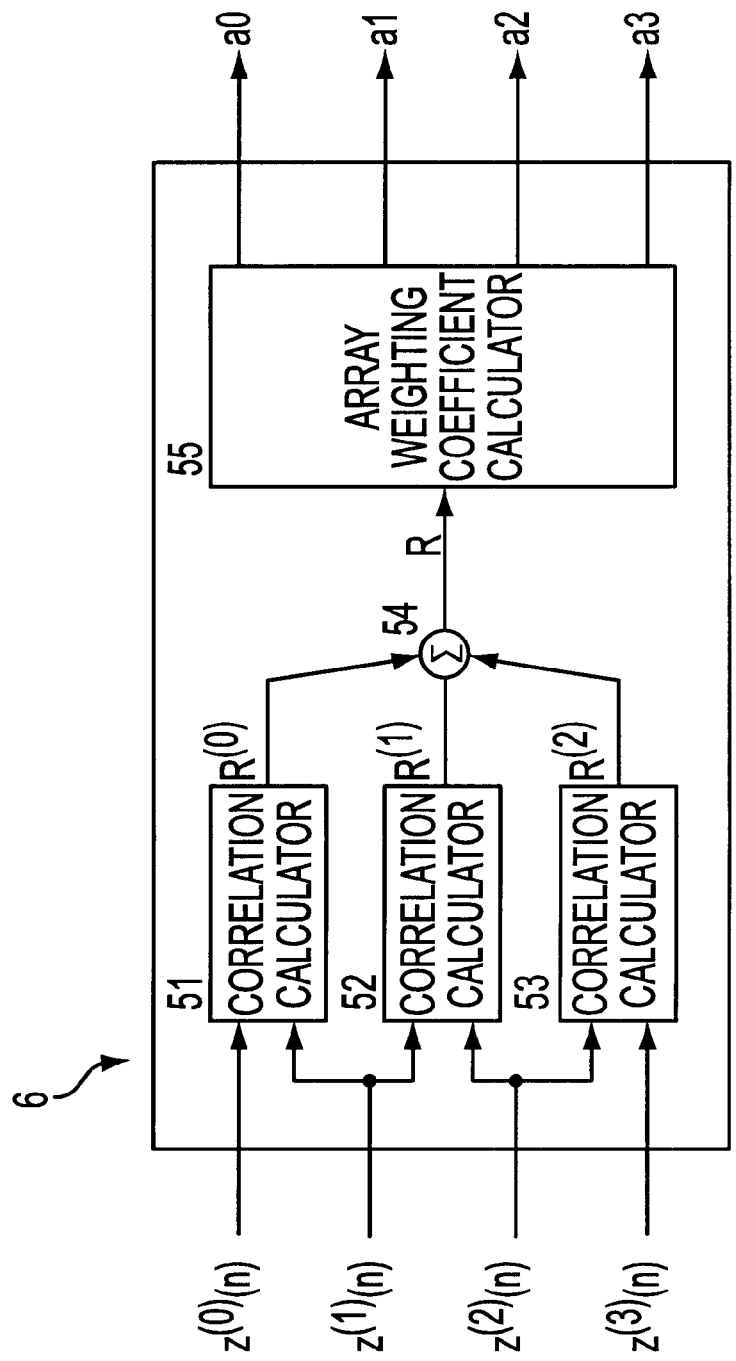
FIG. 5 is a diagram showing an arrival direction estimation unit according to the present invention.
Figure 6:
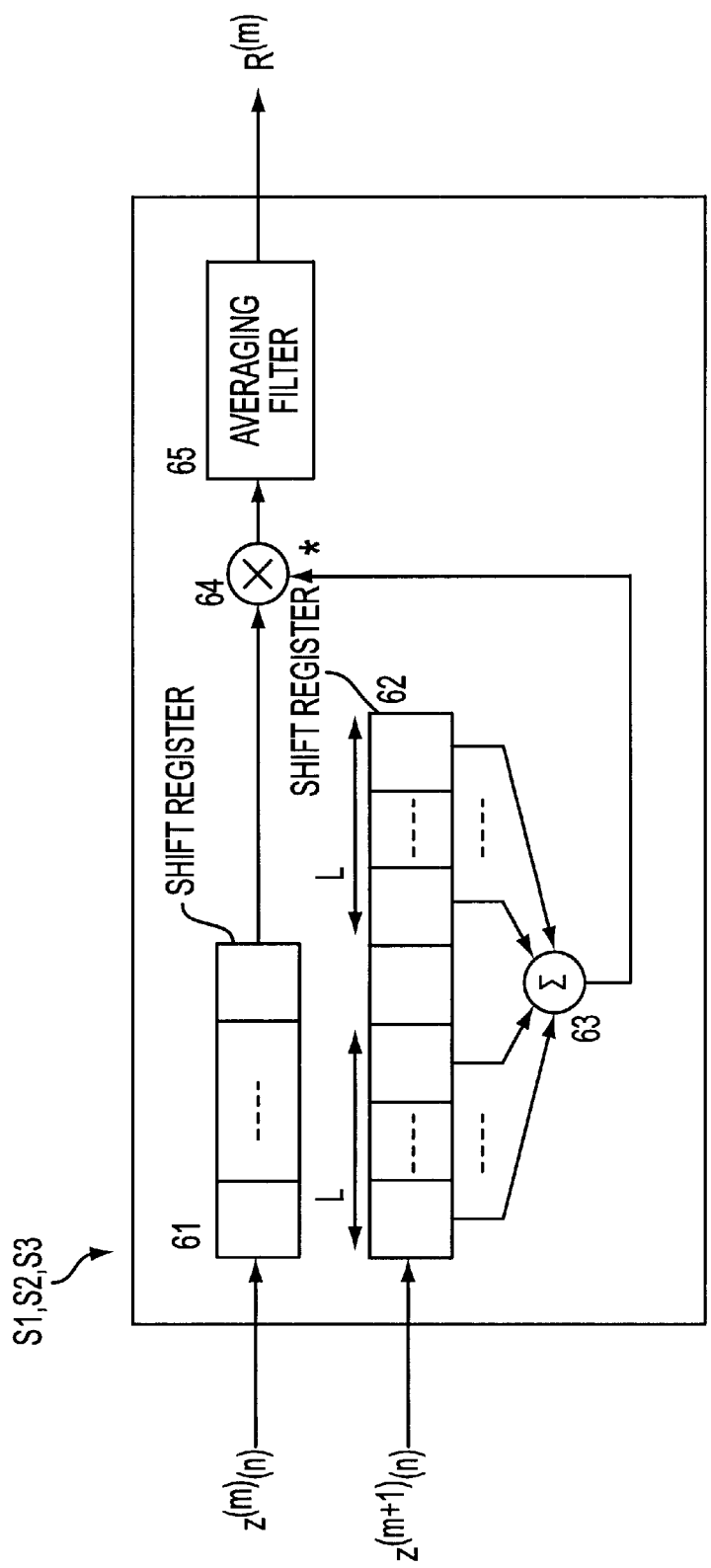
FIG. 6 is a diagram showing a correlation calculator according to the present invention.
Figure 7:
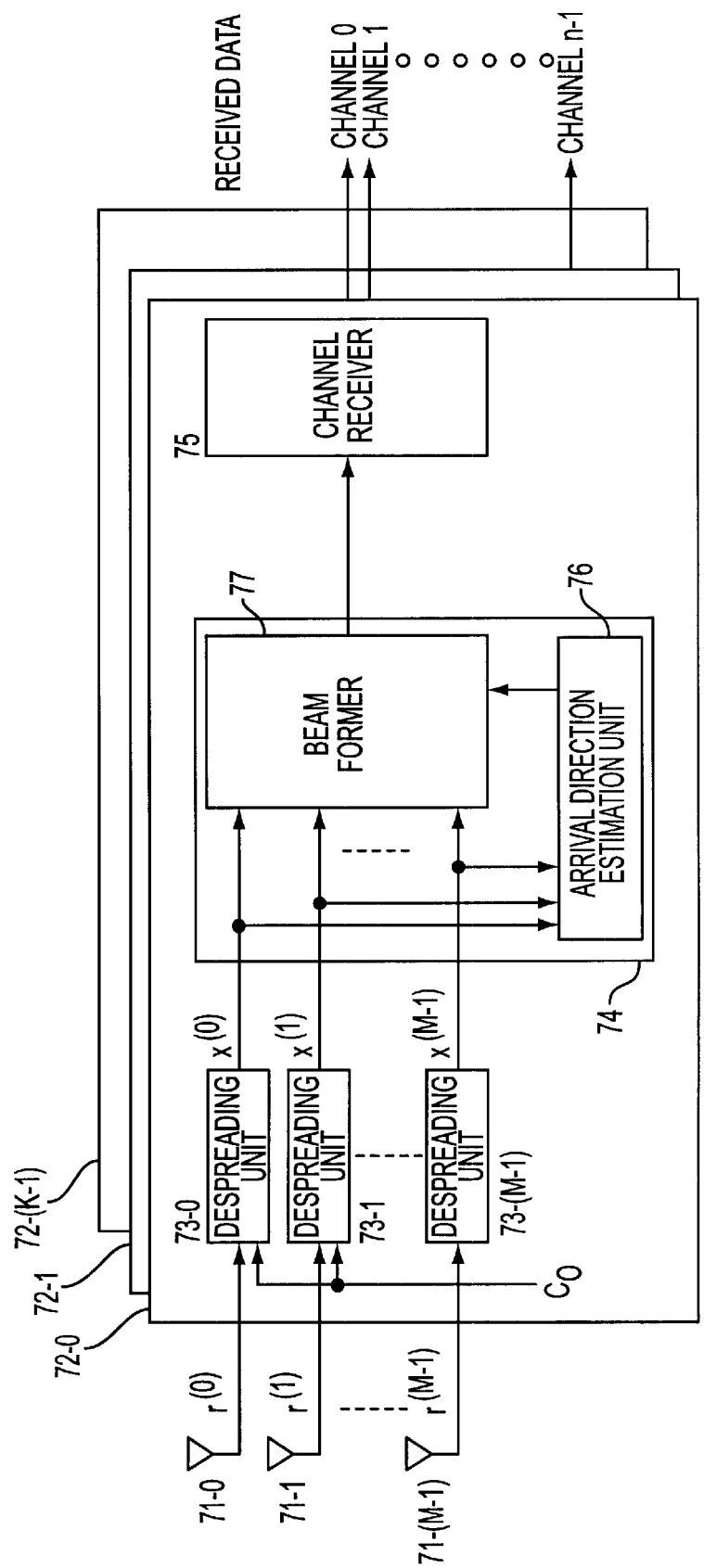
FIG. 7 is a diagram showing a receiver unit of a base station using an array antenna.
Figure 8:
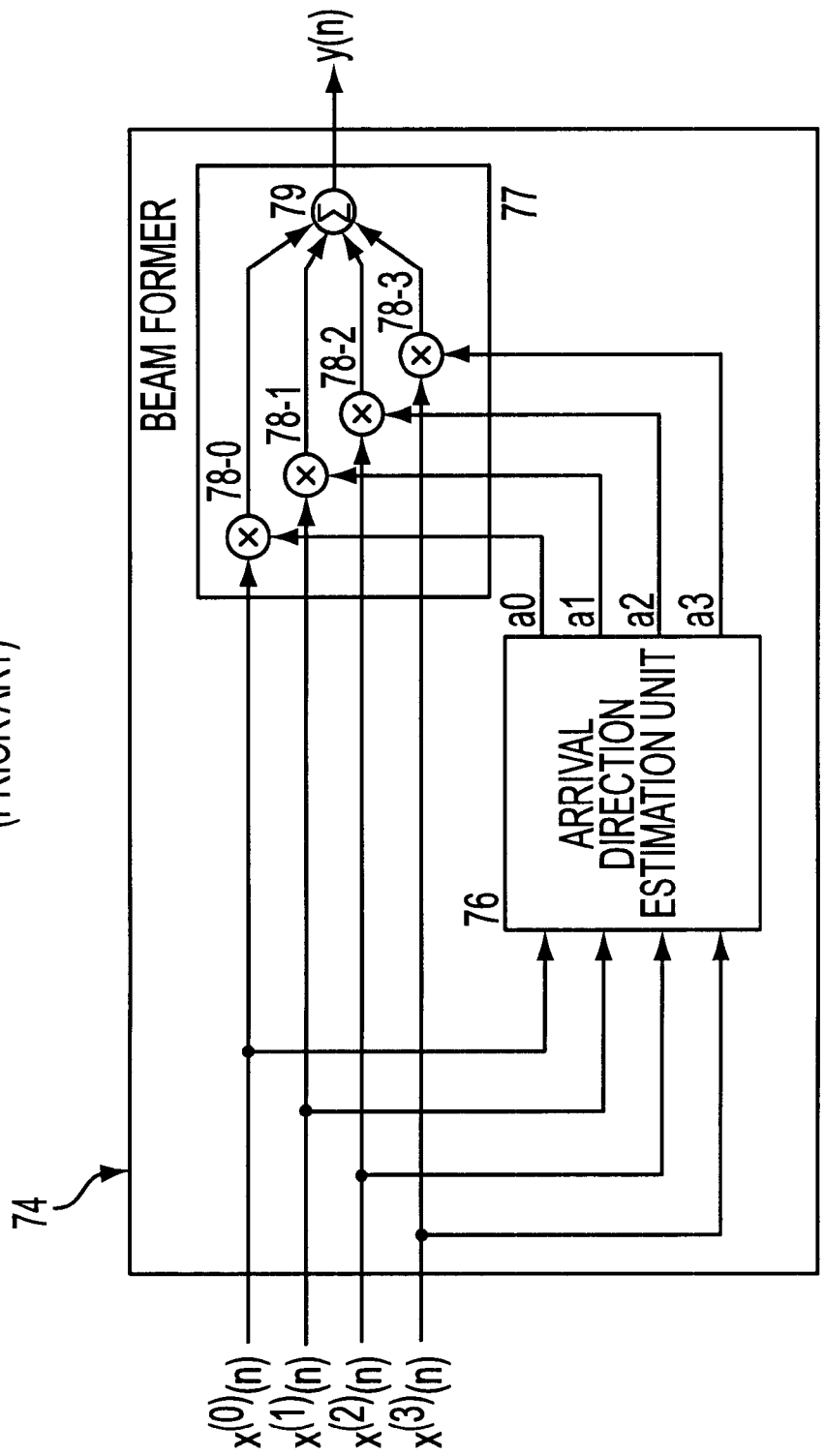
FIG. 8 is a diagram showing a conventional beam forming unit having an arrival direction estimation unit.

The arrival direction estimation unit 6 calculates weighting coefficients a0 to a3 based on the inverse modulated signals z0 to z3, and inputs the weighting coefficients a0 to a3 to the multipliers 41 to 44 of the beam former 7. As shown in FIG. 5, the arrival direction estimation unit 6 includes correlation calculators 51 to 53, an adder 54 and an array weighting coefficient calculator 55. As shown in FIG. 6, the correlation calculators 51 to 53 are each provided with a first shift register 61, a second shift register 62, an adder 63, a multiplier 64 and an averaging filter 65.

The arrival direction estimation unit 6 shown in FIG. 5 has a structure similar to that of the prior art shown in FIG. 9 except that the correlation calculators are constructed differently. In the correlation calculator of the present invention, the inverse modulated output signal $z^{(m)}(n)$ corresponding to the mth antenna element is input to the first shift register 61, and the inverse modulated output signal $z^{(m+1)}(n)$ corresponding to the (m+1) th antenna element is input to the second shift register 62. The adder 63 sums symbols L in both the positive and negative directions, excluding the symbol corresponding to the zero lag from the second shift register 62. An output of this adder 63 is then input to the multiplier 64.

Accordingly, the multiplier 64 obtains a complex conjugate product of the inverse modulated output signal $z^{(m)}(n)$ corresponding to the mth antenna element obtained via the first shift register 61 and the inverse modulated output signal $z^{(m+1)}(n)$ corresponding to the (m+1) th antenna element for the L symbols in both the positive and negative directions excluding the zero lag at the center of the second shift register 62. An output signal of the multiplier 64 is then averaged by the averaging filter 65. In other words, it is possible to obtain the correlation $R^{(m)}$ from the following formula (17). In addition, formula (18) is obtained by developing the terms following the summation. Further, by averaging the correlation $R^{(m)}$ of the formula (17) for each of the antenna elements, the cross-correlation function $R_k$ among the adjacent antenna elements can be obtained from formula (19).

$$R_k^{(m)} = <\sum_{\substack{1=-L \\ 1\neq 0}}^{L} z^{(m)}(n)z^{(m+1)}*(n+1)> \sum_{\substack{1=-L \\ 1\neq 0}}^{L} z^{(m)}(n)z^{(m+1)}*(n+1) = \tag{17}$$

$$|A_k|^2 \exp[j(\phi_k^{(m)} - \phi_k^{(m+1)})] + \sum_{\substack{1=-L \\ 1\neq 0}} \sum_{\substack{i=0 \\ i\neq k}} |A_i|^2 W_{ik}(n)$$

$$W_{ik}*(n+1)\exp[j(\phi_i^{(m)} - \phi_i^{(m+1)})] + \sum_{\substack{1=-L \\ 1\neq 0}}^{L} N^{(m)}(n)N^{(m)}*(n+1) \tag{18}$$

$$R_k = \{1/(M-1)\}\sum_{m=0}^{M-2} R_k^{(m)} \tag{19}$$

In FIG. 5, the output signals $R^{(10)}$ through $R_{(2)}$ of the correlation calculators 51 to 53 are then summed by the adder 54. However, the term $[1/(M-1)]$ of formula (19) averages depending on the number of array antenna elements, which is determined in advance. Accordingly, the function of carrying out the process that corresponds to the term $[1/(M-1)]$ is included in FIG. 5.

Using the cross-correlation function $R_k$ of the formula (19), the arrival angle $\theta_k$ of the kth user is obtained from the following formula (20).

$$\theta_k = \sin^{-1}[(\frac{1}{2}\pi d)\tan^{-1}\{Im(R_k)/Re(R_k)\}] \tag{20}$$

That is, the arrival angle $\theta_k$ is obtained based on the ratio of the imaginary part $Im(R_k)$ and the real part $Re(R_k)$ of the cross-correlation function $R_k$.

The weighting coefficient $a_k^{(m)}$ input to the beam former 7 can be obtained from the following formula (21). Further, output signals $y_{k,D}(n)$ and $y_{k,P}(n)$ of the beam former 7 are described by the following set of formulas (22).

$$a_k^{(m)} = (R_k^*)^{m^-} (m=0 \text{ to } M-1) \tag{21}$$

$$y_{k,D}(n) = \sum_{m=0}^{M-1} a_k^{(m)} D_k^{(m)}(n) \quad \text{Data Signal} \tag{22}$$

$$y_{k,P}(n) = \sum_{m=0}^{M-1} a_k^{(m)} x_k^{(m)}(n) \quad \text{Pilot Signal}$$

In other words, in FIG. 4 the weighting coefficients a0 to a3 from the arrival direction estimation unit 6 are obtained from formula (21). The weighting coefficients a0 to a3 are respectively input to the multipliers 41 to 44 of the beam former 7 and multiplied by the despread output signals $x^{(0)}(n)$ through $x^{(3)}(n)$. The adder 45 then produces an output y(n) by summing the products of the inverse despread output signals $x^{(0)}(n)$ to $x^{(3)}(n)$ and weighting coefficients a0 to a3 while matching the phase with the estimated arrival direction. The phase is matched with the arrival direction because the weighting coefficients a0 through a3 correspond to the complex conjugates of the cross-correlation function $R_k$. The output y(n) of the adder 45 is then input to the channel receiver 5 (refer to FIG. 1), so that the pilot signal $y_P$ and data signal $y_D$ corresponding to the channel are demodulated and output.

It should be noted that the present invention is not limited to the embodiment described above, and various variations and modifications may be made. For example, the functions of the operation processes of the arrival direction estimation unit 6 and the like can be realized by the functions of a digital signal processor (DSP), and other functions can similarly be realized by the functions of the processor. In addition, it is possible to provide an interference canceller or the like to eliminate the interference among the channels.

As described above, according to the present invention, a DS-CDMA communication system performs a transmission by a spreading process using a code having a period longer than a symbol length. Further, received signals from corresponding array antenna elements 1-0 to 1-(M−1) are subjected to a despreading process. Where a cross-correlation function is also obtained for lags excluding the zero lag for signals corresponding to adjacent antenna elements obtained by inverse-modulating despread output signals by a known symbol. An arrival direction of a desired signal is estimated based on a cross-correlation function. For this reason, there is an advantage in that the arrival direction of the desired signal can be estimated accurately, even in cases where the reception level of the desired signal is low or the level of the interference signal is high. Therefore, it is possible to increase the antenna gain of the array antenna, to eliminate the interference, and to reduce the required transmission power.

Further, by obtaining the cross-correlation function for a plurality of symbols in the positive and negative directions other than the zero lag among inverse modulated signals corresponding to the adjacent antenna elements and averaging the cross-correlation functions, there is an advantage in that the degree of estimating the arrival direction of the desired signal can be improved, even with respect to a phase deviation caused by fading or the like.

What is claimed:

1. An arrival direction estimation method in a DS-CDMA communication system including an array antenna for performing a transmission by a spreading process using a code having a period longer than a symbol length, said method comprising the steps of:

subjecting received signals from the array antenna to a despreading process in order to produce despread output signals;

obtaining a cross-correlation function of time lags of the received signals from adjacent antenna elements using inverse-modulating the despread output signals by a known symbol; and estimating an arrival direction of one of the received signals based on the cross-correlation function.

2. The method of claim 1, wherein said cross-correlation function of the time lags between the received signals of adjacent antenna elements exclude a zero time lag.

3. The method of claim 1, further comprising the step of:

averaging values of the cross-correlation function for a plurality of time lags as the cross-correlation function of the time lags of the received signals from the adjacent antenna elements.

4. The arrival direction estimation method of claim 1, wherein said obtaining the cross-correlation function uses both positive and negative time lags between received signals.

5. The method of claim 1, wherein the known symbol is a pilot symbol.

6. The method of claim 1, further comprising the steps of:

providing a decision feedback symbol as the known symbol.

7. An arrival direction estimation method for a DS-CDMA communication system using signals subjected to a spreading process by a code, said method comprising the steps of:

subjecting the signals to a despreading process in order to produce despread signals;

inverse modulating the despread signals using a known symbol in order to obtain inverse modulated signals; and producing weighting coefficients corresponding to arrival directions of the signals from the inverse modulated signals.

8. The method of claim 7, wherein the code has a period longer than a symbol length.

9. The method of claim 7, wherein the producing weighting coefficients includes obtaining a cross-correlation function of time lags from the inverse modulated signals and producing the weighting coefficients based on the cross-correlation function.

10. The method of claim 9, wherein the cross-correlation of the time delays excludes a zero time lag.

11. The method of claim 7, wherein the known symbol is a pilot symbol.

12. The method of claim 7, wherein the known symbol is a decision feedback symbol obtained from a channel receiver.

13. The method of claim 7, which further includes multiplying the despread signals by the weighting coefficients to produce weighted signals.

14. The method of claim 13, which further includes summing the weighted signals in order to produce output signals.

15. A DS-CDMA receiver unit in a DS-CDMA communication system for producing a transmission by a spreading process using a code having a period longer than a symbol length, said receiver unit comprising:

a despreading unit for subjecting received signals to a despreading process to produce despread output signals;

a beam forming unit for receiving said despread output signals from said despreading unit; and a channel receiver for receiving output signals from said beam forming unit;

said beam forming unit including an inverse modulator for inverse-modulating the despread output signals using a known symbol, an arrival direction estimation unit for producing weighting coefficients based on signals from said inverse modulator, and a beam former for producing an output by multiplying the weighting coefficients from said arrival direction estimation unit with the despread output signals producing weighted signals and then combining the weighted signals.

16. The DC-CDMA receiver of claim 15, wherein said inverse modulator inverse-modulates the despread output signals from said despread unit using a pilot symbol.

17. The DC-CDMA receiver unit of claim 15, wherein said inverse modulator inverse-modulates the despread output signals from said despreading unit using a decision feedback symbol from said channel receiver.

18. The DC-CDMA receiver unit of claim 15, wherein said arrival direction estimation unit includes a correlation calculator for obtaining a cross-correlation of the signals from said inverse-modulator, and an array weighting coefficient calculator for calculating the weighting coefficients based on the cross-correlation obtained by said correlation calculator.

19. The DS-CDMA receiver unit of claim 18, wherein said cross-correlation includes a plurality of positive and negative time lags excluding a zero time lag.

20. The DS-CDMA receiver unit of claim 18, wherein said correlation calculator includes a first shift register and a second shift register for receiving signals from said inverse modulator, a multiplier for obtaining the correlation, and an averaging filter, said second shift register provides to said multiplier a plurality of positive and negative time lag symbols with respect to a symbol input to said multiplier from said first shift register.

* * * * *